(12) United States Patent
Zhang et al.

(10) Patent No.: US 12,314,504 B2
(45) Date of Patent: May 27, 2025

(54) DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Guiyu Zhang, Beijing (CN); Hang Min, Beijing (CN); Ping Luo, Beijing (CN); Zhiqiang Wang, Beijing (CN); Liqing Jiang, Beijing (CN); Qiang Wang, Beijing (CN); Shuai Liu, Beijing (CN)

(73) Assignees: CHENGDU BOE OPTOELECTRONICS TECHNOLOGY CO., LTD., Sichuan (CN); BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 18/690,756

(22) PCT Filed: May 23, 2022

(86) PCT No.: PCT/CN2022/094510
§ 371 (c)(1),
(2) Date: Mar. 11, 2024

(87) PCT Pub. No.: WO2023/225803
PCT Pub. Date: Nov. 30, 2023

(65) Prior Publication Data
US 2024/0370112 A1    Nov. 7, 2024

(51) Int. Cl.
*G06F 3/041* (2006.01)
*G06F 3/044* (2006.01)

(52) U.S. Cl.
CPC .......... *G06F 3/0412* (2013.01); *G06F 3/0445* (2019.05)

(58) Field of Classification Search
CPC .............................. G06F 3/0412; G06F 3/0445
(Continued)

(56) References Cited

U.S. PATENT DOCUMENTS

2018/0059843 A1    3/2018  Kim
2020/0089350 A1*   3/2020  Han ...................... G06F 3/0446
(Continued)

FOREIGN PATENT DOCUMENTS

CN    107728830 A    2/2018
CN    109901747 A    6/2019
(Continued)

OTHER PUBLICATIONS

International Search Report and Written Opinion mailed on Nov. 25, 2022, in corresponding PCT/CN2022/094510, 11 pages.

*Primary Examiner* — Mark Edwards
(74) *Attorney, Agent, or Firm* — XSENSUS LLP

(57) ABSTRACT

A display panel and a display device are disclosed. The display panel includes a display substrate and a touch screen. The touch screen includes a third touch control layer. The third touch control layer includes a first connection part and a second connection part. The first electrode disconnected in the first display area is made conductive through the first connection part, and the second electrode disconnected in the first display area is made conductive through the second connection part. The first connection part and the second connection part form a new mutually capacitive coupling structure in the first display area, thereby achieving the touch function of the first display area. The material of the third touch control layer is transparent conductive material.

20 Claims, 12 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2020/0343325 A1* | 10/2020 | Cai | .................. H10K 59/65 |
| 2022/0129096 A1* | 4/2022 | Dai | .................. G06F 3/0445 |
| 2022/0165813 A1* | 5/2022 | Li | .................. G06F 3/04164 |

FOREIGN PATENT DOCUMENTS

| | | | | |
|---|---|---|---|---|
| CN | 112466920 A | * | 3/2021 | ........... G06F 3/0412 |
| CN | 112654917 A | | 4/2021 | |
| CN | 113518966 A | | 10/2021 | |

* cited by examiner

DISPLAY PANEL AND DISPLAY APPARATUS

CROSS REFERENCE TO RELATED APPLICATION

The present application is a U.S. National Stage of International Application No. PCT/CN2022/094510, filed on May 23, 2022, the content of which is incorporated by reference herein in its entirety.

TECHNICAL FIELD

The present disclosure relates to the field of display technology, and in particular, to a display panel and a display device.

BACKGROUND

With the development of display technology, providing sensors under the display panel can expand the display area of the display device and improve the display effect of the display device. Therefore, under-screen sensing technology is currently being used more and more in display panels.

When the sensor, such as a camera module and a light sensor, is provided under the display panel, the touch screen in the display area above the sensor will reduce the transmittance of light, thus affecting the sensing effect of the sensor.

It should be noted that the information disclosed in the above background is only used to enhance understanding of the background of the present disclosure, and therefore may include information that does not constitute prior art known to those of ordinary skill in the art.

SUMMARY

According to an aspect of the present disclosure, there is provided a display panel, including a display area, where the display area includes a first display area and a second display area arranged around the first display area, and the display panel includes a display substrate and a touch screen, the touch screen includes a first touch control layer, a second touch control layer and a third touch control layer. The first touch control layer is provided on a side of the display substrate, the first touch control layer includes at least one first electrode extending along a first direction, the first electrode is disconnected in the first display area, and a first segment and a second segment are formed. The second touch control layer is provided on a side of the first touch control layer away from the display substrate, the second touch control layer is insulated from the first touch control layer, the second touch control layer includes at least one second electrode extending along a second direction, the second direction intersects the first direction, and the second electrode is disconnected in the first display area, and a third segment and a fourth segment are formed. The third touch control layer is provided on a different layer from the first touch control layer and the second touch control layer, the third touch control layer is insulated from the first touch control layer and the second touch control layer, the third touch control layer includes at least one set of a first connection part and a second connection part, the second connection part and the first connection part are not in conduction with each other and form a capacitance, the first segment and the second segment are electrically connected through the first connection part, the third segment and the fourth segment are electrically connected through the second connection part, and a material of the third touch control layer is transparent conductive material.

In an embodiment of the present disclosure, the second connection part and the first connection part are arranged on a same layer, and the second connection part is spaced apart at the outer periphery of the first connection part.

In an embodiment of the present disclosure, the third touch control layer is provided between the first touch control layer and the second touch control layer, and the touch screen further includes a first insulating layer and a second insulating layer. The first insulating layer is provided between the first touch control layer and the third touch control layer, a first via hole is provided on the first insulating layer, and the first touch control layer passes through the first via hole and is electrically connected to the first connection part. The second insulating layer is provided between the third touch control layer and the second touch control layer, a second via hole is provided on the second insulating layer, and the second touch control layer passes through the second via hole and is electrically connected to the second connection part.

In an embodiment of the present disclosure, the third touch control layer is provided on a side of the first touch control layer close to the display substrate, and the touch screen further includes a first insulating layer and a second insulating layer. The first insulating layer is provided between the first touch control layer and the third touch control layer, and a first via hole and a second via hole are provided on the first insulating layer. The second insulating layer is provided between the first touch control layer and the second touch control layer, a third via hole is provided on the second insulating layer, and an orthographic projection of the third via hole on the display substrate is located within an orthographic projection of the first via hole on the display substrate. The first touch control layer passes through the second via hole and is electrically connected to the second connection part, and the second touch control layer passes through the third via hole and the first via hole and is electrically connected to the first connection part.

In an embodiment of the present disclosure, the third touch control layer is provided on a side of the second touch control layer away from the display substrate, and the touch screen further includes a first insulating layer and a second insulating layer. The first insulating layer is provided between the first touch control layer and the second touch control layer, and a first via hole is provided on the first insulating layer. The second insulating layer is provided between the second touch control layer and the third touch control layer, a second via hole and a third via hole are provided on the second insulating layer, and an orthographic projection of the second via hole on the display substrate is located within an orthographic projection of the first via hole on the display substrate. The first touch control layer passes through the first via hole and the second via hole and is electrically connected to the first connection part, and the second touch control layer passes through the third via hole and is electrically connected to the second connection part.

In an embodiment of the present disclosure, the first connection part is circular and the second connection part is annular;
    a diameter of the first connection part is: $D2 \geq D1+2b$;
    a width of the second connection part is: $A \geq 2b$;
    where: D2 is the diameter of the first connection part, D1 is a diameter of a second opening, b is a diameter of the first via hole, and A is the width of the second connection part.

In an embodiment of the present disclosure, the first touch control layer includes a plurality of first electrodes extending along the first direction, and the plurality of first electrodes are disconnected in the first display area, and a plurality of sets of first segments and second segments are formed; the second touch control layer includes a plurality of second electrodes extending in the second direction, and the plurality of second electrodes are disconnected in the first display area and a plurality of sets of third segments and fourth segments are formed; the third touch control layer includes a plurality of sets of first connection parts and second connection parts, the plurality of sets of first connection parts and second connection parts form a plurality of capacitors, the plurality of first connection parts are not in conduction with each other, the plurality of the second connection parts are not in conduction with each other, each set of the first segment and the second segment is electrically connected through one of the first connection parts, and each set of the third segment and the fourth segment is electrically connected through one of the second connection parts.

In an embodiment of the present disclosure, the second connection part and the first connection part are provided in different layers, and the first connection part is provided on a side of the first touch control layer close to the display substrate, and the second connection portion is provided on a side of the second touch control layer away from the display substrate.

In an embodiment of the present disclosure, a part of the first touch control layer located in the first display area is removed and a first opening is formed, and a part of the second touch control layer located in the second display area is removed and a second opening is formed, an orthographic projection of the first display area on the display substrate is located within an orthographic projection of the second opening on the display substrate, and an orthographic projection of the second opening on the display substrate is located within an orthographic projection of the first opening on the display substrate.

In an embodiment of the present disclosure, the display panel further includes a third insulating layer. The third insulating layer is provided between the display substrate and the first touch control layer.

In an embodiment of the present disclosure, the display panel further includes a second base substrate. The second base substrate is provided on a side of the second touch control layer away from the display substrate.

In an embodiment of the present disclosure, the display substrate includes a driving backplate, a pixel layer and an encapsulation layer. The pixel layer is provided on a side of the driving backplate, and the encapsulation layer is provided on a side of the pixel layer away from the driving backplate, and the touch screen is provided spaced on a side of the encapsulation layer away from the driving backplate.

In an embodiment of the present disclosure, the display substrate includes a driving backplate, a pixel layer and an encapsulation layer. The pixel layer is provided on a side of the driving backplate, and the encapsulation layer is provided on a side of the light-emitting layer away from the driving backplate, and the touch screen is attached to a side of the encapsulation layer away from the driving backplate.

According to yet another aspect of the present disclosure, there is provided a display device, including the display panel according to another aspect of the present disclosure.

It should be understood that the above general description and the detailed description that follows are exemplary and explanatory only and do not limit the present disclosure.

BRIEF DESCRIPTION OF THE DRAWINGS

The accompanying drawings, which are incorporated in and constitute an integral part of this specification, illustrate embodiments consistent with the disclosure and together with the description, serve to explain the principles of the disclosure. Obviously, the drawings in the following description are only some embodiments of the present disclosure. For those of ordinary skill in the art, other drawings can be obtained based on these drawings without exerting creative efforts.

Figure 1:
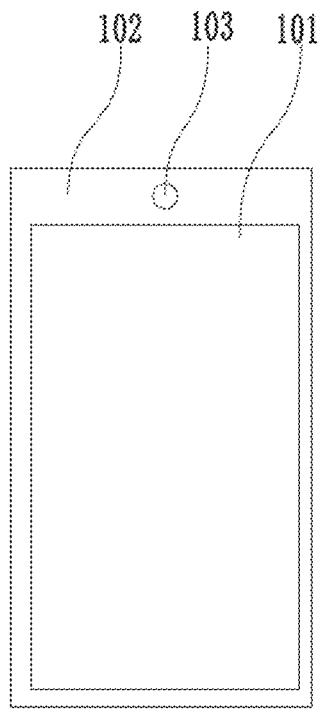
FIG. 1 is a schematic plan view of a display panel according to an embodiment of the present disclosure, where an opening area is provided in a non-display area of the display panel.

In the figures: 1—display panel, 101—display area, 1011—first display area, 1012—second display area, 102—non-display area, 103—opening area, 104—bank, 1041—first bank, 1042—second bank, 11—display substrate, 111—driving backplate, 112—first base substrate, 113—buffer layer, 114—thin film transistor, 1141—active layer, 1142—gate insulating layer, 1143—gate electrode, 1144—interlayer insulating layer, 1145—interlayer dielectric layer, 1146—first source electrode, 1147—drain electrode, 1148—protective layer, 115—first planarization layer, 116—pixel layer, 117—pixel definition layer, 1171—pixel opening, 118—sub-pixel, 1181—third electrode, 1182—light-emitting element, 1183—fourth electrode, 119—encapsulation layer, 1191—first inorganic encapsulation layer, 1192—organic encapsulation layer, 1193—second inorganic encapsulation layer; 12—touch screen, 121—first touch control layer, 1211—first electrode, 1212—first segment, 1213—second segment, 1214—first dummy electrode, 1215—first opening, 122—second touch control layer, 1221—second electrode, 1222—third segment, 1223—fourth segment, 1224—second dummy electrode, 1225—second opening, 123—third touch control layer, 1231—first connection part, 1232—second connection part, 124—first insulating layer, 125—second insulating layer, 126—third insulating layer, 127—second base substrate, 1201—first via hole, 1202—second via hole, 1203—third via hole; 13—first optical adhesive layer; 14—polarizer layer, 15—second optical adhesive layer, 16—glass cover, 17—heat dissipation film, 2—camera module.

DETAILED DESCRIPTION

Example embodiments will now be described more fully with reference to the accompanying drawings. Example embodiments may, however, be embodied in various forms and should not be construed as limited to the embodiments set forth herein; rather, these embodiments are provided so that this disclosure will be thorough and complete and will fully convey the concepts of the example embodiments to those skilled in the art. The same reference numerals in the drawings indicate the same or similar structures, and thus their detailed descriptions will be omitted. Furthermore, the drawings are merely schematic illustrations of the present disclosure and are not necessarily drawn to scale.

Although relative terms, such as "below" and "above" are used in this specification to describe the relative relationship of one component of an icon to another component, these terms are used in this specification only for convenience, for example, according to direction of the example described in the drawings. It will be understood that if the device of the icon were turned upside down, components described as "above" would become components as "below". When a structure is "above" another structure, it may mean that the structure is integrally formed on the other structure, or that the structure is "directly" placed on the other structure, or that the structure is "indirectly" placed on the other structure through another structure.

The terms "a", "an", "the", "said" and "at least one" are used to indicate the existence of one or more elements/component connections/etc.; the terms "include" and "have" are used to indicate open-ended, inclusive meaning and refers to that there may be additional elements/component connections/etc. in addition to the listed elements/component connections/etc.; the terms "first", "second" and "third" and so on are only used as markers and are not restrictions on the number of objects.

As human-computer interaction becomes more frequent and in-depth, consumers have higher and higher requirements for the appearance of touch display devices, and increasing the screen-to-body ratio of display panels has become a trend. In the related art, sensors are placed under the display, such as under-screen fingerprint unlocking technology and (Full Display with Camera, FDC) under-screen camera technology.

Figure 2:
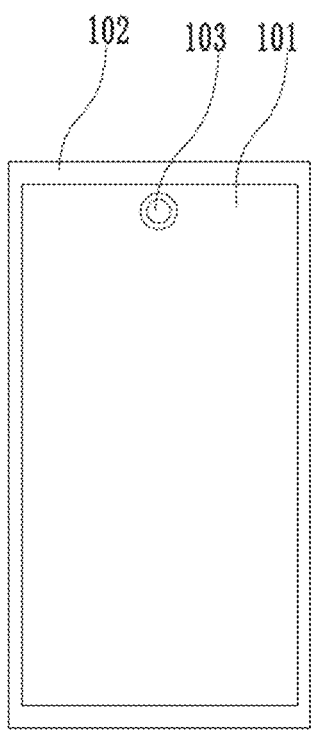
FIG. 2 is a schematic plan view of a display panel according to an embodiment of the present disclosure, where an opening area is provided in a display area of the display panel.
Figure 3:
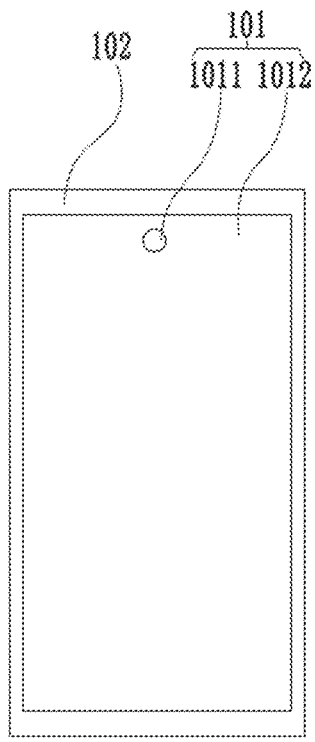
FIG. 3 is a schematic plan view of a display panel according to an embodiment of the present disclosure, where a first display area is provided in a display area of the display panel.

The following explains the changes in the camera module setting method. Referring to FIG. 1, the setting method of the camera module has gradually changed from the early non-full-screen design to non-display area 102 of a full-screen with an opening area 103, and the opening area 103 is set as a notch area. Referring to FIG. 2, the opening area 103 is set in the non-display area 102, and then the opening area 103 (AA Hole) is set in the display area 101 of the full-screen. Referring to FIG. 3, it evolves from the display area 101 with opening area 103 (AA Hole) design to the full-screen under-screen camera (Full Display with Camera, FDC) design.

Figure 4:
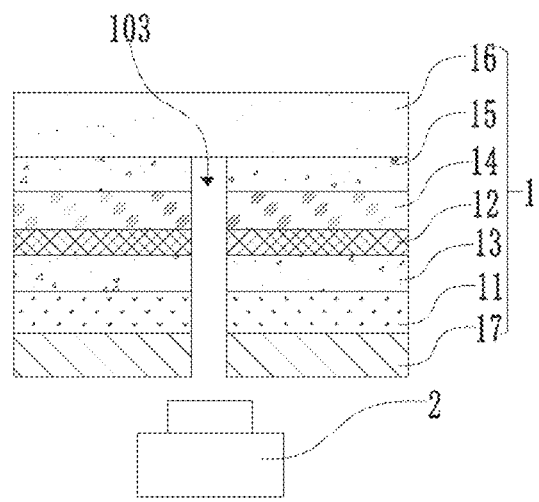
FIG. 4 is a schematic cross-sectional view of a camera module provided in an opening area of a display area according to an embodiment of the present disclosure.
Figure 5:
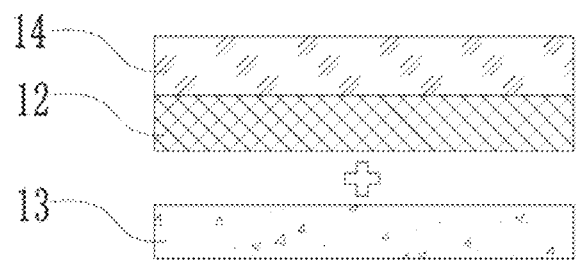
FIGS. 5 to 8 are schematic diagrams of the processing process for the display panel in FIG. 4.
Figure 6:
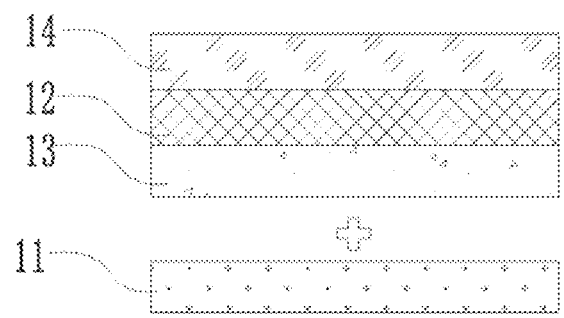
Figure 7:
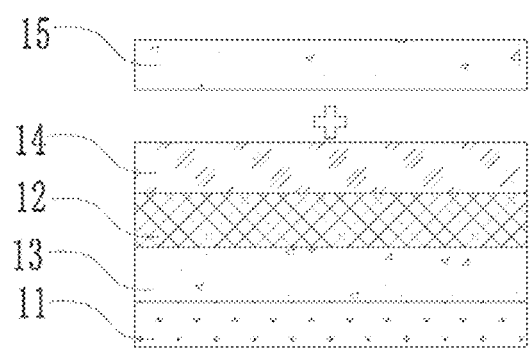
Figure 8:
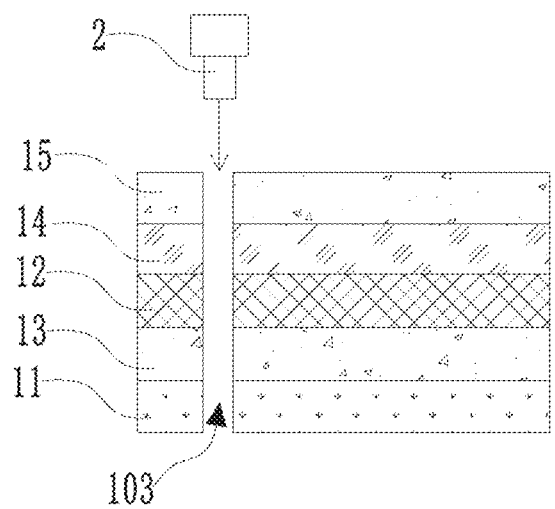

As OLED display technology matures, OLED display panels are used more and more. Usually, after perforating, the stacked layers in the display panel 1 is shown in FIG. 4. A display substrate 11 is provided on one side of a heat dissipation film 17. A first optical adhesive layer 13 is provided on one side of the display substrate 11 away from the heat dissipation film 17. A touch screen 12 is provided on one side of the first optical adhesive layer 13 away from the heat dissipation film 17. A second optical adhesive layer 15 is provided on one side of the touch screen 12 away from the heat dissipation film 17. A glass cover 16 is provided on one side of the second optical adhesive layer 15 away from the heat dissipation film 17. The process flow of perforating is shown in FIGS. 5 to 8. Among all the stacked layers of the display panel, except that the glass cover 16 is not perforated, the heat dissipation film 17, the display substrate 11, the first optical adhesive layer 13, the touch screen 12, polarizer layer 14 and the second optical adhesive layer 15 all need to be perforated to reserve a shooting channel for the camera module 2. Therefore, all stacked layers in the opening area 103 need to be specially designed. The design plan of providing the opening area 103 in the display area 101 has high requirements on the overall process.

Figure 9:
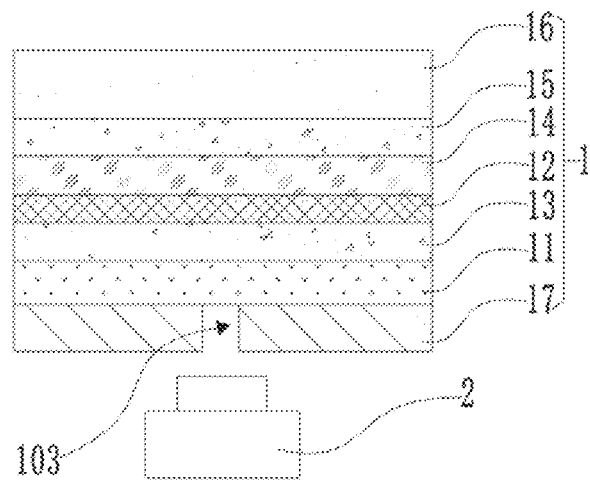
FIG. 9 is a schematic cross-sectional view of a camera module provided in a first display area of a display panel according to an embodiment of the present disclosure.

In order to reduce cost and improve yield, Full Display with Camera (FDC) under-screen camera technology is about to emerge. Referring to FIG. 9, only the heat dissipation film 17 of the display panel 1 is perforated to reserve a shooting channel for the camera module 2. Neither of the display substrate 11, the first optical adhesive layer 13, the touch screen 12, the polarizer layer 14, the second optical adhesive layer 15, and the glass cover 16 needs to be specially designed.

Figure 10:
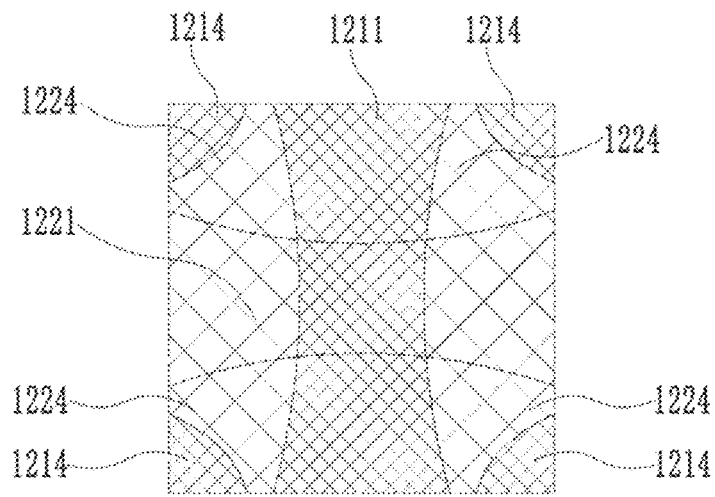
FIG. 10 is a schematic plan view of a touch screen not including a third touch control layer according to an embodiment of the present disclosure.

Touch screens can be classified into add on mode touch panel and on cell touch panel according to their composition and structure. No matter which form of touch screen is used, the metal mesh (MM) design shown in FIG. 10 can be used. The touch screen 12 generally includes a first touch control layer 121 (RX Layer) and a second touch control layer 122 (TX Layer). The second touch control layer 122 is insulated from the first touch control layer 121, and the side of the second touch control layer 122 away from the first touch control layer 121 is also insulated. The first touch control layer 121 includes a first electrode 1211 and a first dummy electrode 1214, and the second touch control layer 122 includes a second electrode 1221 and a second dummy electrode 1224.

It can be understood that if the projection of the camera module on the display panel is the first display area and the touch screen uses a metal grid, and no design changes are made to the touch screen in the first display area, then the metal grid will definitely be included in the picture when shooting by the camera module, resulting in abnormal shooting effects. Therefore, in order to address the above-mentioned adverse effects, the structure of the existing touch screen needs to be changed so that it can meet the requirements for the shooting effect of the camera module.

In view of this, the embodiments of the present disclosure provide a display panel. Referring to FIGS. 11 to 17, the display panel includes a display area 101 and a non-display area 102 located on the periphery of the display area 101. The display area 101 includes a first display area 1011 and a second display area 1012 arranged around the first display area 1011. The display panel includes a display substrate 11 and a touch screen 12. The touch screen 12 includes a first touch control layer 121, a second touch control layer 122 and a third touch control layer 123. The first touch control layer 121 is provided on one side of the display substrate 11. The first touch control layer 121 is provided with a first opening 1215. The first touch control layer 121 includes at least one first electrode 1211 extending along a first direction. Each first electrode 1211 is disconnected in the first display area 1011, forming a first segment 1212 and a second segment 1213. The second touch control layer 122 is provided on one side of the first touch control layer 121 away from the display substrate 11. The second touch control layer 122 is insulated from the first touch control layer 121. The second touch control layer 122 includes at least one second electrode 1221 extending along a second direction. The second direction intersects the first direction. Each second electrode 1221 is disconnected in the first display area 1011, forming a third segment 1222 and a fourth segment 1223. The third touch control layer 123 is located on a different layer from the first touch control layer 121 and the second touch control layer 122, and the third touch control layer 123 is insulated from the first touch control layer 121 and the second touch control layer 122. The third touch control layer 123 includes at least one set of a first connection part 1231 and a second connection part 1232. The second connection part 1232 and the first connection part 1231 are not conductive to each other and form a capacitor. The first segment 1212 is electrically connected to the second segment 1213 through the first connection part 1231, and the third segment 1222 is electrically connected to the fourth segment 1223 through the second connection part 1232. The material of the third touch control layer 123 is a transparent conductive material.

The touch screen 12 located in the first display area 1011 includes a third touch control layer 123. The third touch control layer 123 includes a first connection part 1231 and a second connection part 1232. The first connection part 1231 conducts the first electrode 1211 of the first touch control layer 121 disconnected in the first display area 1011, and the second connection part 1232 conducts the second electrode 1221 of the second touch control layer 122 disconnected in the first display area 1011. The first connection part 1231 and the second connection part 1232 forms a new mutual capacitive coupling structure in the first display area 1011. The touch function of the first display area 1011 is realized through the new mutual capacitive coupling structure, and the third touch control layer 123 is made of transparent conductive material. Therefore, the display panel can increase the light transmittance of the first display area 1011 and improve the sensing effect of the sensor while ensuring the touch function.

When the sensor is a camera module, the first display area 1011 may be the projection of the under-screen camera module on the display substrate 11, that is, the imaging area. After the light transmittance of the first display area 1011 is increased, when shooting by the camera module, the metal grid will not appear in the captured image, and the camera module has a better shooting effect.

It should be noted that the first direction is the y direction shown in the figure, and the second direction is the x direction shown in the figure.

As shown in FIGS. 11 to 15, the second connection part 1232 and the first connection part 1231 may be arranged on the same layer, and the second connection part 1232 is spaced apart at the outer periphery of the first connection part 1231.

Figure 11:
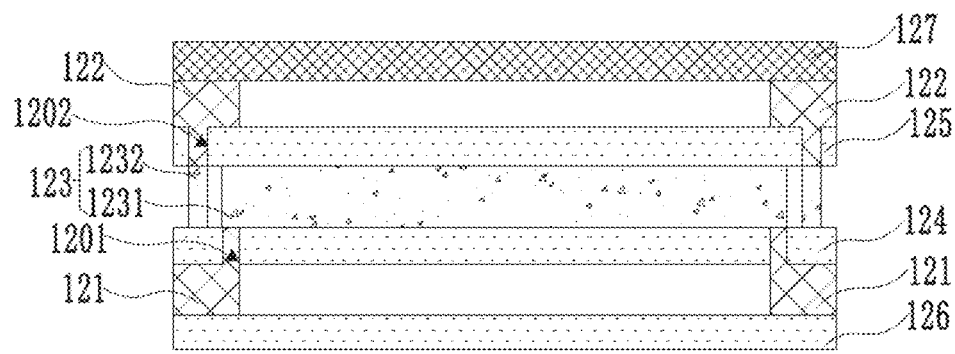
FIG. 11 is a schematic cross-sectional view of a third touch control layer of a touch screen according to the embodiment of the present disclosure, where the third touch control layer is between a first touch control layer and a second touch control layer.

As shown in FIG. 11, the touch screen 12 includes a first touch control layer 121, a second touch control layer 122, a third touch control layer 123, a first insulating layer 124 and a second insulating layer 125. The third touch control layer 123 is provided between the first touch control layer 121 and the second touch control layer 122. The first insulating layer 124 is provided between the first touch control layer 121 and the third touch control layer 123, and the second insulating layer 125 is provided between the third touch control layer 123 and the second touch control layer 122. The first touch control layer 121 passes through the first insulating layer 124 and is electrically connected to the first connection part 1231, and the second touch control layer 122 passes through the second insulating layer 125 and is electrically connected to the second connection part 1232.

The part of the first touch control layer 121 located in the first display area 1011 is removed. The first electrode 1211 is divided into a first segment 1212 and a second segment 1213 by the first area along a first direction. The part of the first touch control layer 121 located in the first display area 1011 is removed, and the second electrode 1221 is divided into a third segment 1222 and a fourth segment 1223 by the first area along a second direction. The first segment 1212 and the second segment 1213 are electrically connected through the first connection part 1231, and the third segment 1222 and the fourth segment 1223 are electrically connected through the second connection part 1232.

It should be noted that the removed part of the first touch control layer 121 is the first opening 1215, and the removed part of the second touch control layer 122 is the second opening 1225. The orthographic projection of the first display area 1011 on the display substrate 11 is located within the orthographic projection of the second opening 1225 on the display substrate 11, and the orthographic projection of the second opening 1225 on the display substrate 11 is located within the orthographic projection of the first opening 1215 on the display substrate 11.

Figure 12:
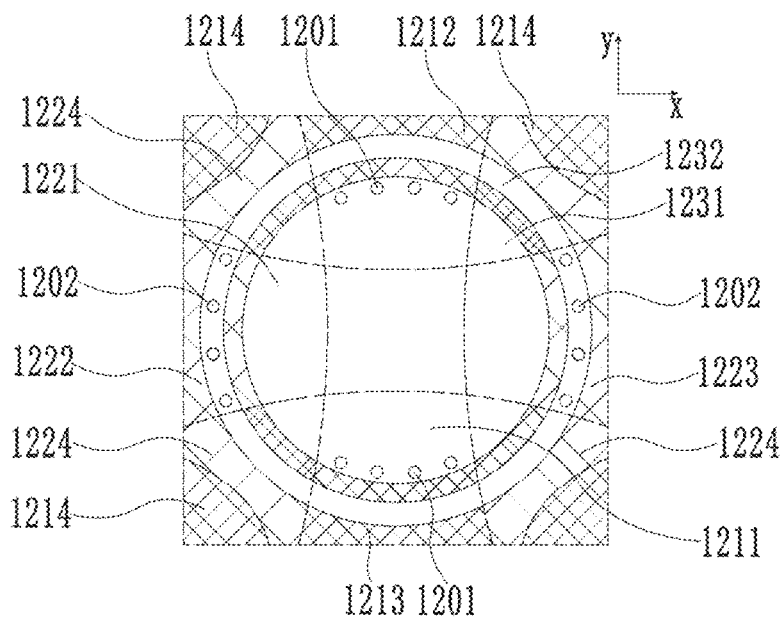
FIG. 12 is a schematic plan view of a touch screen in which a first electrode and a second electrode pass through a first display area according to an embodiment of the present disclosure.

As shown in FIG. 12, when only one first electrode 1211 and one second electrode 1221 pass through the first display area 1011, the third touch control layer 123 includes one first connection part 1231 and one second connection part 1232. The shapes of the first connection part 1231 and the second connection part 1232 are not limited, but usually the first connection part 1231 needs to be continuous and uninterrupted between the connection line of the first segment 1212 and the second segment 1213, and the second connection part 1232 needs to be continuous and uninterrupted between the connection line of the third segment 1222 and the fourth segment 1223.

The shape of the first display area 1011 includes, but is not limited to, a circle, and may also be a regular polygon or a square. The shape of the first connection part 1231 includes, but is not limited to, a circle. The shape of the first connection part 1231 can also be changed from a circle to a regular polygon or a square. The shape of the second connection part 1232 includes, but is not limited to, a circular ring, and may also be changed from a circular ring to an unclosed arc.

The first insulating layer 124 is provided with a first via hole 1201 along a first direction. The first touch control layer 121 passes through the first via hole 1201 and is electrically connected to the first connection part 1231. Specifically, the first segment 1212 of the first electrode 1211 is electrically connected to the second segment 1213 through the first connection part 1231. The first connection part 1231 may also passes through the first via hole 1201 and be electrically connected to the first touch control layer 121, which is not specifically limited here.

The second insulating layer 125 is provided with a second via hole 1202 along a second direction. The second touch control layer 122 passes through the second via hole 1202 and is electrically connected to the second connection part 1232. Specifically, the third segment 1222 of the second electrode 1221 is electrically connected to the fourth segment 1223 through the second connection part 1232. The second connection part 1232 may also passes through the second via hole 1202 and be electrically connected to the second touch control layer 122, which is not specifically limited here.

The first electrode 1211 partially overlaps with the first connection part 1231. The overlapping area between the first electrode 1211 and the first connection part 1231 is a first overlapping area. The first via hole 1201 is usually provided within an orthographic projection of the first overlapping area on the first insulating layer 124. The first via holes 1201 are symmetrically provided on both sides of the first opening 1215 along the first direction. The second electrode 1221 partially overlaps with the second connection part 1232. The overlapping area between the second electrode 1221 and the second connection part 1232 is a second overlapping area. The second via hole 1202 is usually provided within an orthographic projection of the second overlapping area on the second insulating layer 125. The second via holes 1202 are symmetrically provided on both sides of the second opening 1225 along the second direction.

It should be noted that the number of the first via holes 1201 and the second via holes 1202 is usually greater than one, in order to prevent poor contact or disconnection between the first electrode 1211 and the first connection part 1231 at a certain first via holes 1201, and poor contact or disconnection between the second electrode 1221 and the second connection portion 1232 at a certain second via hole 1202, affecting the touch effect of the touch screen 12. In addition, the number of the first via holes 1201 and the second via holes 1202 should not be too large to avoid affecting the shooting effect.

Figure 13:
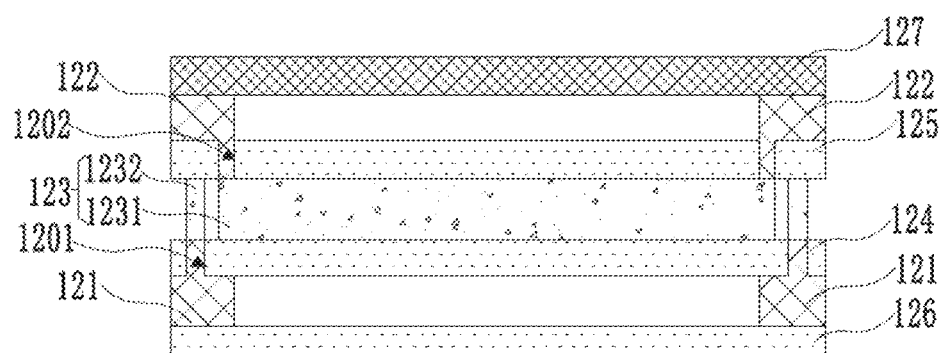
FIG. 13 is another schematic cross-sectional view of a third touch control layer of a touch screen according to the embodiment of the present disclosure, where the third touch control layer is between a first touch control layer and a second touch control layer.

As shown in FIG. 13, the first touch control layer 121, the second touch control layer 122 and the third touch control layer 123 may also be electrically connected in such a manner that the first touch control layer 121 passes through the first insulating layer 124 and is electrically connected to the second connection part 1232, and the second touch control layer 122 passes through the second insulating layer 125 and is electrically connected to the first connection part 1231.

Figure 14:
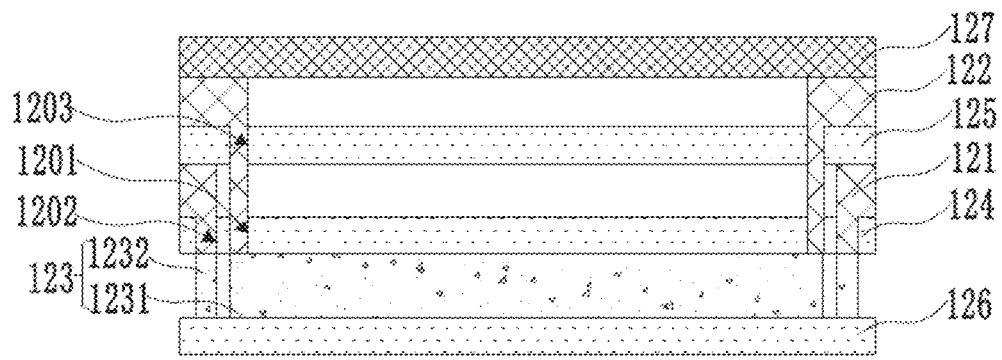
FIG. 14 is a schematic cross-sectional view of a third touch control layer of a touch screen according to an embodiment of the present disclosure, where the third touch control layer is disposed on a side of a first touch control layer close to the display substrate.

As shown in FIG. 14, the third touch control layer 123 can also be provided on the side of the first touch control layer 121 close to the display substrate 11. The touch screen 12 also includes a first insulating layer 124 and a second insulating layer 125. The first insulating layer 124 is provided between the first touch control layer 121 and the third touch control layer 123. The first insulating layer 124 is provided with a first via hole 1201 and a second via hole 1202. The second insulating layer 125 is provided between the first touch control layer 121 and the second touch control layer 122. A third via hole 1203 is provided on the second insulating layer 125. The orthographic projection of the third via hole 1203 on the display substrate 11 is located within the orthographic projection of the first via hole 1201 on the display substrate 11. The first touch control layer 121 passes through the second via hole 1202 and is electrically connected to the second connection part 1232, and the second touch control layer 122 passes through the third via hole 1203 and the first via hole 1201, and is electrically connected to the first connection part 1231.

Figure 15:
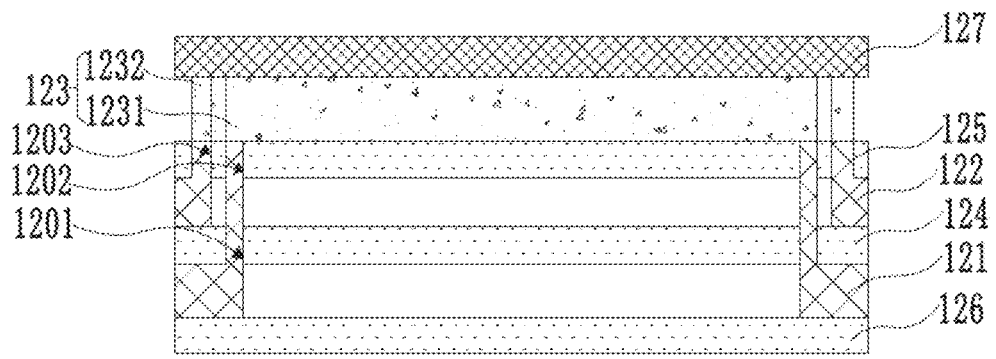
FIG. 15 is a schematic cross-sectional view of a third touch control layer of a touch screen according to an embodiment of the present disclosure, where the third touch control layer is disposed on a side of a second touch control layer away from the display substrate.

As shown in FIG. 15, the third touch control layer 123 can also be provided on the side of the second touch control layer 122 away from the display substrate 11. The touch screen 12 also includes a first insulating layer 124 and a second insulating layer 125. The first insulating layer 124 is provided between the first touch control layer 121 and the second touch control layer 122. The first insulating layer 124 is provided with a first via hole 1201. The second insulating layer 125 is provided between the second touch control layer 122 and the third touch control layer 123. The second insulating layer 125 is provided with a second via hole 1202 and a third via hole 1203. The orthographic projection of the second via hole 1202 on the display substrate 11 is located within the orthographic projection of the first via hole 1201 on the display substrate 11. The first touch control layer 121 passes through the first via hole 1201 and the second via hole 1202 and is electrically connected to the first connection part 1231, and the second touch control layer 122 passes through the third via hole 1203 and is electrically connected to the second connection part 1232.

The first touch control layer 121 includes a plurality of first electrodes 1211 extending along a first direction, and the second touch control layer 122 includes a plurality of second electrodes 1221 extending along a second direction.

Depending on the location and size of the first display area 1011, the plurality of first electrodes 1211 can be disconnected in the first display area 1011 to form multiple sets of first segments 1212 and second segments 1213; the plurality of second electrodes 1221 can be disconnected in the first display area 1011 to form multiple sets of third segments 1222 and fourth segments 1223.

The third touch control layer 123 may include multiple sets of first connection parts 1231 and second connection parts 1232. The multiple sets of first connection parts 1231 and second connection parts 1232 form multiple capacitors. The multiple first connection parts 1231 are not conductive to each other. The multiple second connection parts 1232 are not conductive to each other. Each set of the first segment 1212 and the second segment 1213 are conducted through one first connection part 1231, and each set of the third segment 1222 and the fourth segment 1223 are electrically connected through one second connection part 1232.

It should be noted that the number of the first connection parts 1231 is the same as the number of the first electrodes 1211 passing through the first display area 1011, and the number of the second connection parts 1232 is the same as the number of the second electrodes 1221 passing through the second display area 1012. The shape of the first connection part 1231 and the shape of the second connection part 1232 change according to the shape of the first display area 1011. Generally, the shape spliced by the multiple first connection parts 1231 arranged along the second direction is the same as that of the first display area, and the shape spliced by the multiple second connection parts 1232 arranged along the first direction is the same as that of the outer frame of the first display area 1011.

Figure 16:
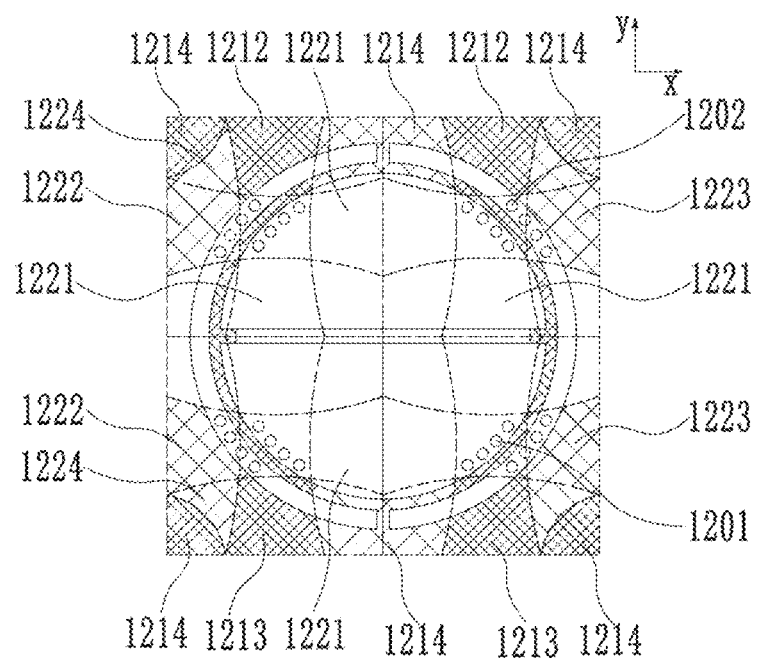
FIG. 16 is a schematic plan view of a touch screen in which two first electrodes and two second electrodes pass through a first display area according to an embodiment of the present disclosure.

As shown in FIG. 16, when two first electrodes 1211 and two second electrodes 1221 pass through the first display area 1011, the two first electrodes 1211 are both disconnected in the first display area 1011, forming two sets of first segments 1212 and second segment 1213; and the two second electrodes 1221 are both disconnected in the first display area 1011, forming two sets of third segments 1222 and fourth segments 1223. There are two first connection parts 1231. The two first connection parts 1231 are spaced apart along the first direction. One first connection part 1231 connects one set of the first segment 1212 and the second segment 1213, and the other first connection part 1231 connects another set of the first segment 1212 and the second segment 1213. There are two second connection parts 1232. The two second connection parts 1232 are spaced apart along the second direction. One second connection part 1232 connects one set of the third segment 1222 and the fourth segment 1223, and the other second connection part 1232 connects another set of the third segment 1222 and the fourth segment 1223.

The two first electrodes 1211 are connected to the first connection part 1231 in the same way. The connection method of one first electrode 1211 and the first connection part 1231 will be described in detail below. The orthographic projection of a set of first segment 1212 and the second segment 1213 on the display substrate 11 overlaps with the orthographic projection of one first connection part 1231 on the display substrate 11. The overlapping area of the first electrode 1211 and the first connection part 1231 is a first overlapping area. One first electrode 1211 and one first connection part 1231 form two first overlapping areas. The two first overlapping areas are provided on both sides of the first display area 1011 along the first direction. The two first overlapping areas are respectively provided with first via holes 1201, and one first connection part 1231 is connected to the first segment 1212 and the second segment 1213 of one first electrode 1211 through the first via hole 1201.

The two second electrodes 1221 are connected to the second connection part 1232 in the same way. The connection method of one second electrode 1221 and the second connection part 1232 will be described in detail below. The orthographic projection of a set of third segment 1222 and fourth segment 1223 on the display substrate 11 overlaps with the orthographic projection of one second connection part 1232 on the display substrate 11. The overlapping area of the second electrode 1221 and the second connection part 1232 is a second overlapping area. One second electrode 1221 and one second connection portion 1232 form two second overlapping areas. The two second overlapping areas are provided on both sides of the first display area 1011 along the second direction. The two second overlapping areas are respectively provided with second via holes 1202, and one second connection portion 1232 is connected to the third segment 1222 and the fourth segment 1223 of one second electrode 1221 through the second via hole 1202.

The shape of the first connection part 1231 includes, but is not limited to, a semicircle. The shape of the first connection part 1231 may also be changed from a circle to a regular polygon or a square. The shape of the second connection part 1232 includes, but is not limited to, a semi-circular arc, and may also be formed into a U shape.

Figure 17:
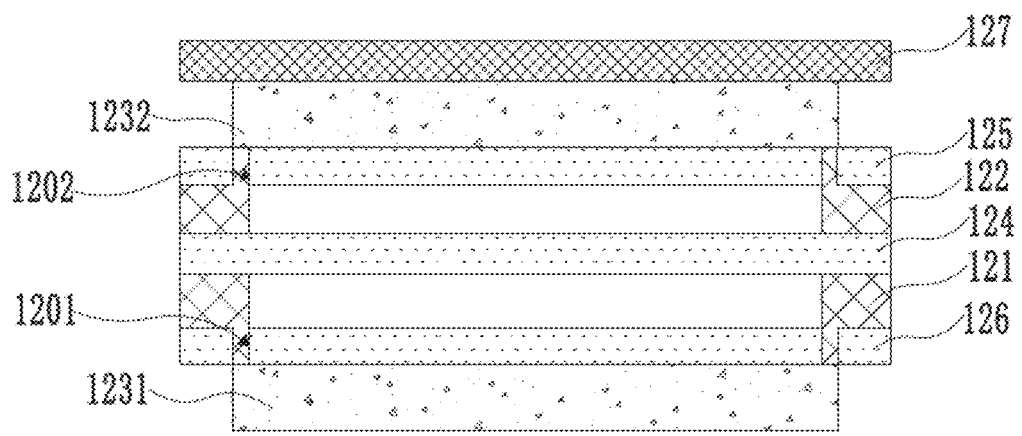
FIG. 17 is a schematic cross-sectional view of a first connection part and a second connection part located on different layers according to the embodiment of the present disclosure.
Figure 18:
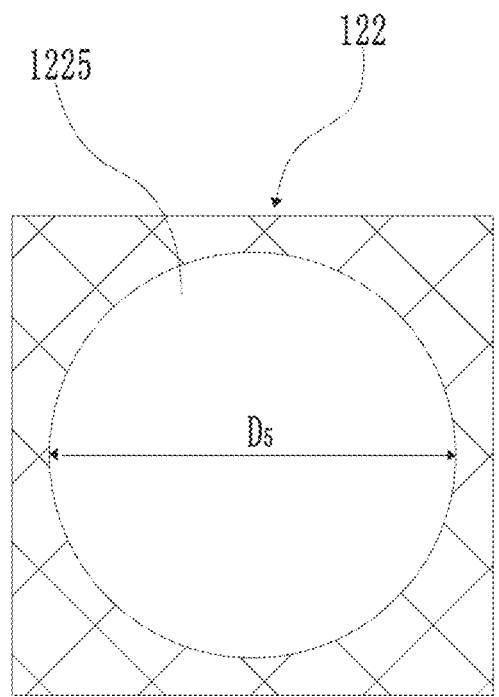
FIG. 18 is a schematic plan view of a second touch control layer according to an embodiment of the present disclosure.
Figure 19:
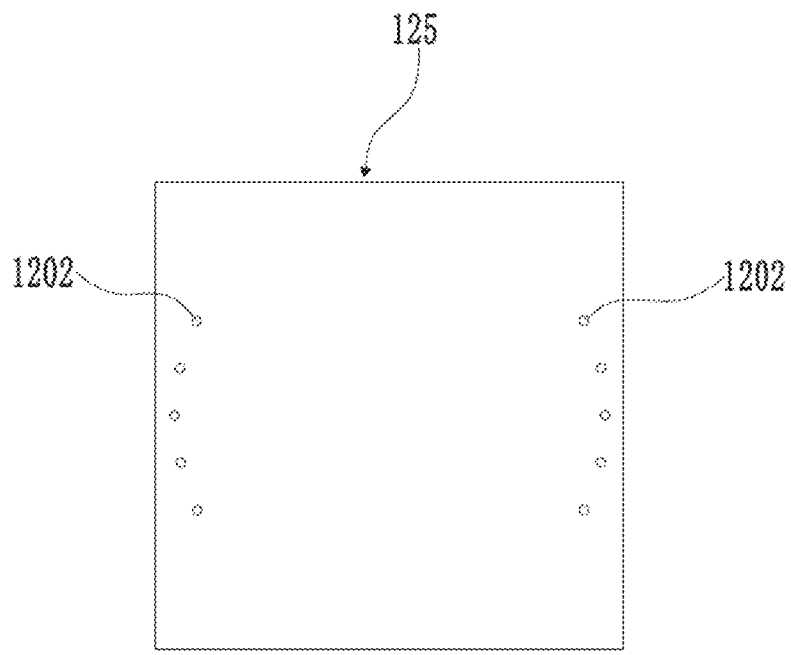
FIG. 19 is a schematic plan view of a second insulating layer according to an embodiment of the present disclosure.
Figure 20:
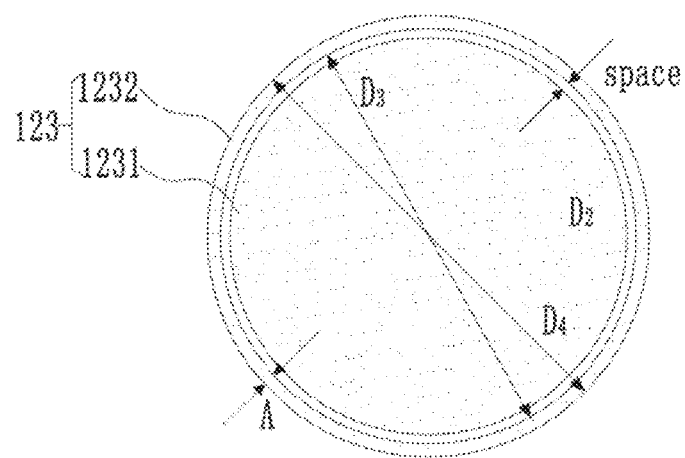
FIG. 20 is a schematic plan view of a third touch control layer according to an embodiment of the present disclosure.
Figure 21:
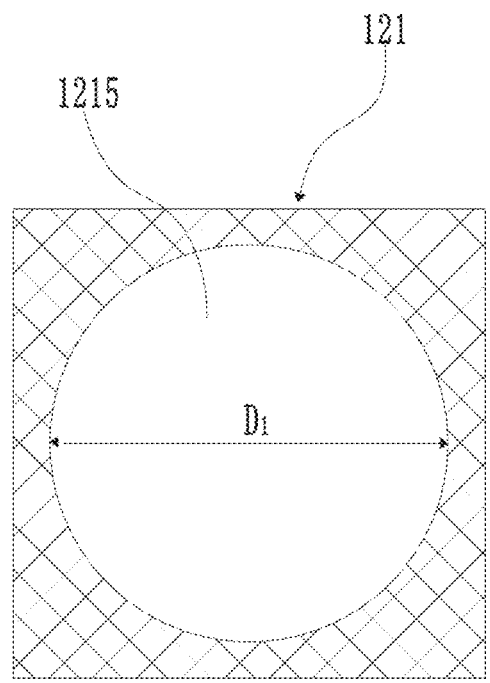
FIG. 21 is a schematic plan view of a first touch control layer according to an embodiment of the present disclosure.
Figure 22:
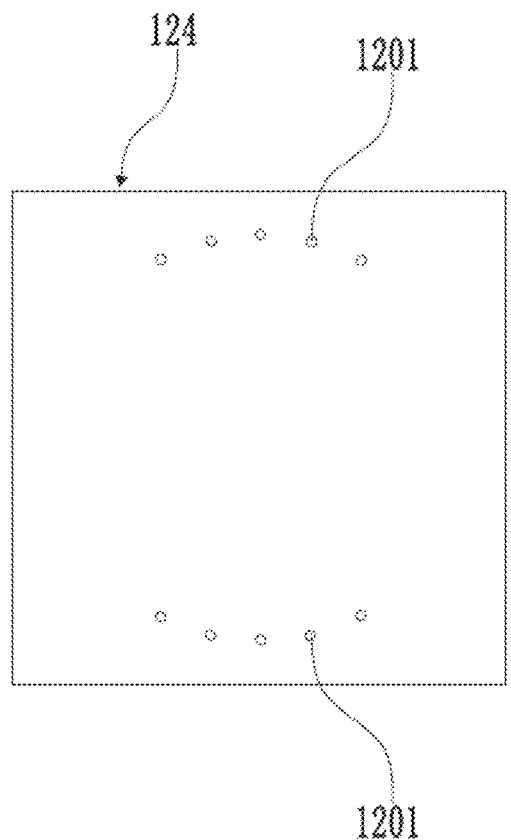
FIG. 22 is a schematic plan view of a first insulating layer according to an embodiment of the present disclosure.
Figure 23:
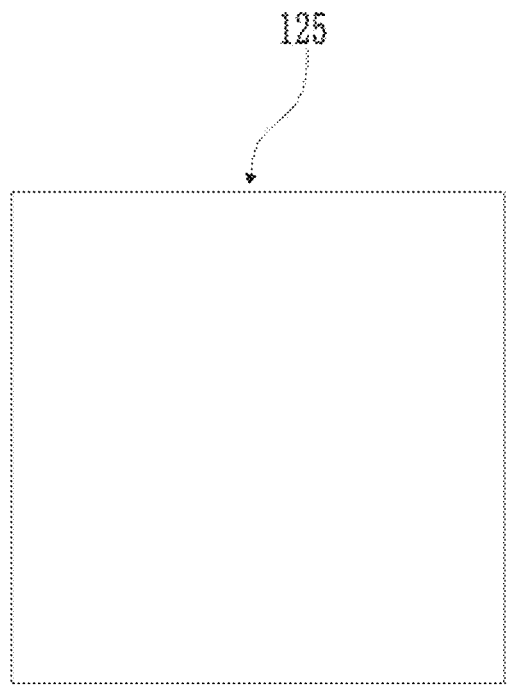
FIG. 23 is a schematic structural diagram of a third insulating layer according to an embodiment of the present disclosure.

In addition, the second connection part 1232 and the first connection part 1231 are provided in different layers. As shown in FIG. 17, the first connection part 1231 is provided on the side of the first touch control layer 121 close to the display substrate 11, and the second connection part 1232 is provided on the side of the second touch control layer 122 away from the display substrate 11.

The following takes an external hanging touch screen as an example to describe the touch screen provided by the embodiment of the present disclosure in detail.

The touch screen 12 includes a second base substrate 127, a first touch control layer 121, a first insulating layer 124, a third touch control layer 123, a second insulating layer 125, a second touch control layer 122 and a third insulating protective layer.

Referring to FIG. 12 and FIG. 18 to FIG. 23, the second touch control layer 122 is formed on the second base substrate 127, and the part of the second touch control layer 122 located in the first display area 1011 is removed to form the second opening 1225. The second insulating layer 125 is provided on the second touch control layer 122, and several second via holes 1202 are provided in the second insulating layer 125. The third touch control layer 123 is formed on the second insulating layer 125. The third touch control layer 123 includes a circular first connection part 1231 and annular second connection parts 1232 spaced apart at the periphery of the first connection part 1231. The first insulating layer 124 is formed on the side of the third touch control layer 123 away from the second base substrate 127, and several first via holes 1201 are provided in the first insulating layer 124. The first touch control layer 121 is formed on the side of the first insulating layer 124 away from the second base substrate 127, and the part of the first touch control layer 121 located in the first display area 1011 is removed to form a first opening 1215.

The first electrode 1211 partially overlaps with the first connection part 1231. The overlapping area between the first electrode 1211 and the first connection part 1231 is a first overlapping area. The first via hole 1201 is usually provided within an orthographic projection of the first overlapping area on the first insulating layer 124, and the first via holes 1201 are symmetrically provided on both sides of the first opening 1215 along the first direction. The second electrode 1221 partially overlaps with the second connection part 1232. The overlapping area of the second electrode 1221 and the second connection part 1232 is a second overlapping area. The second via hole 1202 is usually provided within an orthographic projection of the second overlapping area on the second insulating layers 125, and the second via holes 1202 are symmetrically provided on both sides of the second opening 1225 along the second direction. The first connection part 1231 is connected to the first segment 1212 and the second segment 1213 of the first electrode 1211 through the first via hole 1201, and the second connection part 1232 is connected to the third segment 1222 and the fourth segment 1223 of the second electrode 1221 through the second via hole 1202.

The first display area 1011 is a circular area, and the first opening 1215 and the second opening 1225 are both circular holes. The diameter of the first opening 1215 is related to the diameter of the first display area 1011. Generally, the diameter of the first opening 1215 is: $D1 \geq D0+a$; the diameter of the second opening 1225 is: $D5 \geq D1$. Where, D1 is the diameter of the first opening 1215, D0 is the diameter of the first display area 1011, and a is the fitting tolerance.

The diameter of the first connection part 1231 is related to the diameter of the first display area 1011. The diameter of the first connection part 1231 may be: $D2 \geq D1+2b+2OL$; the inner diameter of the second connection part 1232 is: $D3 \geq D2+2Space$; the outer diameter of the second connection part 1232 is: $D4 \geq D3+2b+4OL$; the width of the second connection part 1232 is: $A=D4-D3$, Space and b can be set to be equal, so $A \geq 2b+4OL$.

D2 is the diameter of the first connection part 1231; D1 is the diameter of the second opening 1225; b is the diameter of the first via hole 1201; A is the width of the second connection part 1232; OL is the alignment tolerance between two adjacent layers, generally $\leq 5$ μm; Space is the separation distance between the first connection part 1231 and the second connection part 1232, Space is related to the process capability, and generally, Space is required to be $\geq 5$ μm.

The sizes of the first via hole 1201 and the second via hole 1202 are related to the process capability and are required to be as small as possible.

The second base substrate 127 can be a rigid material such as glass, or a flexible material such as polyethylene terephthalate (PET), polyimide (PI), cycloolefin polymer (COP) or acrylic. The materials of the first touch control layer 121 and the second touch control layer 122 require low sheet resistance, generally $\leq 0.5\Omega/\square$. Usually the first insulating layer 124 is provided on the entire surface of the touch screen 12 and is made of transparent non-conductive material, such as organic OC or inorganic SiNx, etc. The third touch control layer 123 requires the use of transparent conductive materials, such as ITO, Ag and other materials.

The display panel also includes a third insulating layer 126 provided between the display substrate 11 and the first touch control layer 121. The third insulating layer 126 is the same as the first insulating layer 124 and the second insulating layer 125. The difference is that the third insulating layer 126 does not need to be provided with the first via hole 1201 or the second via hole 1202.

In the field of mobile phones and wearables, a flexible multi-layer structure (Flexible Multi-Layer On Cell, FMLOC) is adopted for the touch screen 12, that is, the touch screen 12 is integrated into the thin film encapsulation layer 119 (TFE) of the OLED display panel, thus achieving low cost.

Figure 24:
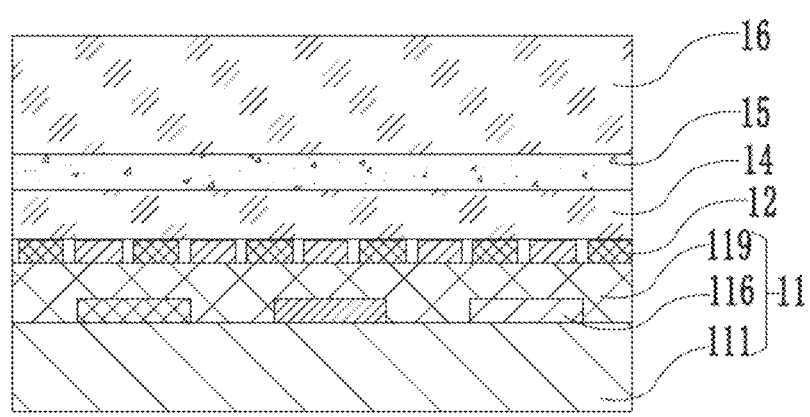
FIG. 24 is a schematic cross-sectional view of a display panel according to an embodiment of the present disclosure.

Referring to FIG. 24, the display substrate 11 includes a driving backplate 111, a pixel layer 116, and an encapsulation layer 119. The pixel layer 116 is provided on one side of the driving backplate 111, and the encapsulation layer 119 is provided on one side of the pixel layer 116 away from the driving backplate 111. The touch screen 12 is attached to the side of the encapsulation layer 119 away from the driving backplate 111. The display panel also includes a polarizer layer 14, a second optical adhesive layer 15 and a glass cover 16. The polarizer layer 14 is provided on the side of the touch screen 12 away from the driving backplate 111. The second optical adhesive layer 15 is provided on one side of the polarizer layer 14 away from the driving backplate 111, and the glass cover 16 is provided on one side of the second optical adhesive layer 15 away from the driving backplate 111.

Figure 25:
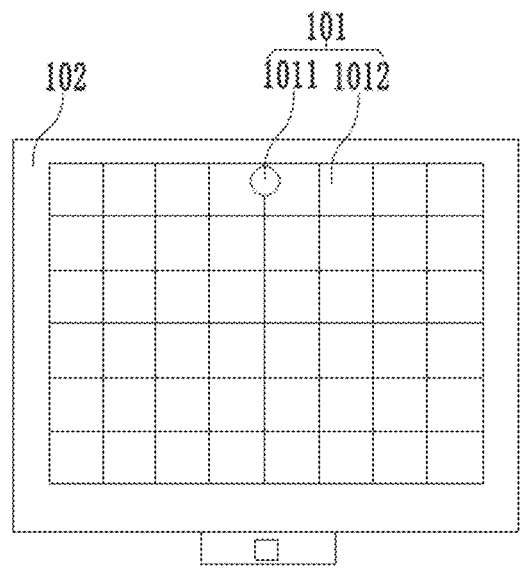
FIG. 25 is a schematic plan view of another display panel according to an embodiment of the present disclosure.

Referring to FIG. 25, the OLED display panel is not only applicable in the wearable field and mobile phone field, but also notebook computer (NB) and vehicle-mounted display panels are gradually beginning to apply OLED display panels. Notebook computers and vehicle-mounted display panels also use under-screen camera technology. The display area 101 of the display panel includes a first display area 1011 and a second display area 1012 located on the periphery of the first display area 1011. However, notebook computers and vehicle-mounted display panels have different size requirements for display panels than mobile phones. Their products are larger in size. In order to realize the active pen function, external hanging touch screens are usually used.

Figure 26:
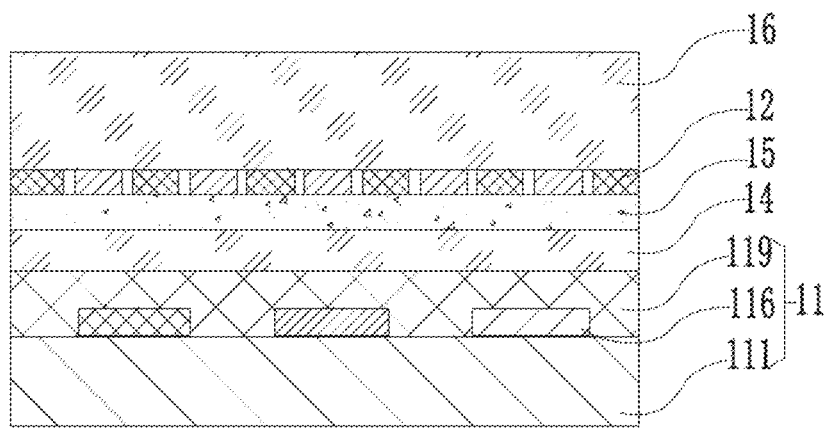
FIG. 26 is a schematic cross-sectional view of another display panel according to an embodiment of the present disclosure.

Referring to FIG. 26, the display substrate 11 includes a driving backplate 111, a pixel layer 116, and an encapsulation layer 119. The pixel layer 116 is provided on one side of the driving backplate 111, and the encapsulation layer 119 is located on one side of the pixel layer 116 away from the driving backplate 111. The display panel also includes a polarizer layer 14, a second optical adhesive layer 15 and a glass cover. The polarizer layer 14 is provided on the side of the encapsulation layer 119 away from the driving backplate 111. The second optical adhesive layer 15 is provided on the polarizer layer 14 away from the driving backplate 111. The touch screen 12 is provided on the side of the second optical adhesive layer 15 away from the driving back plate 111, and the glass cover 16 is provided on the side of the touch screen 12 away from the driving back plate 111.

Figure 27:
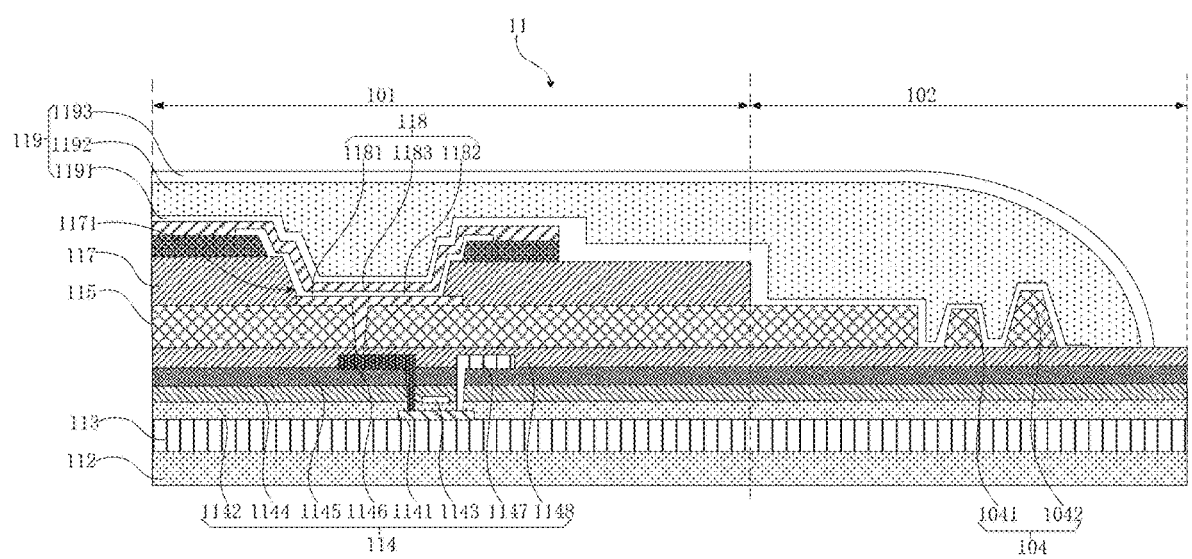
FIG. 27 is a schematic cross-sectional view of a display substrate according to an embodiment of the present disclosure.

As shown in FIG. 27, the driving backplate 111 may include a first base substrate 112 and a plurality of thin film transistors 114. The thin film transistor 114 may be a top gate type or a bottom gate type. Taking a top gate type thin film transistor as an example, the thin film transistor 114 may include an active layer 1141, a gate insulating layer 1142, a gate electrode 1143 and a source and drain electrode, where:

The active layer 1141 is provided on one side of the first base substrate 112, and the material of the active layer 141 can be polysilicon, amorphous silicon, etc., and the active layer 1141 can include a channel region and two doped regions of different doping types located on both sides of the channel region.

The gate insulating layer 1142 may cover the active layer 1141 and the first base substrate 112, and the material of the gate insulating layer 1142 is an insulating material such as silicon oxide.

The gate electrode 1143 is provided on one side of the gate insulating layer 1142 away from the first base substrate 112 and directly opposite the active layer 1141. That is, the projection of the gate electrode 1143 on the first base substrate 112 is located within the projection range of the active layer 141 on the first base substrate 112. For example, the projection of the gate electrode 1143 on the first base substrate 112 coincides with the projection of the channel region of the active layer 1141 on the first base substrate 112.

The thin film transistor 114 also includes an interlayer insulating layer 1144. The interlayer insulating layer 1144 covers the gate electrode 1143 and the gate insulating layer 1142. The thin film transistor 114 also includes an interlayer dielectric layer 1145. The interlayer dielectric layer 1145 is provided on one side of the interlayer insulating layer 1144 away from the first base substrate 112. The interlayer insulating layer 1144 and the interlayer dielectric layer 1145 are both made of insulating materials, but the materials of the interlayer insulating layer 1144 and the interlayer dielectric layer 1145 may be different.

The source and drain electrodes are provided on the surface of the interlayer dielectric layer 1145 away from the first base substrate 112, and the source and drain electrodes include a first source electrode 1146 and a drain electrode 1147, and the first source electrode 1146 and the drain electrode 1147 are connected to the active layer 1141. For example, the first source electrode 1146 and the drain electrode 1147 are respectively connected to two doped regions of the corresponding active layer 1141 through via holes.

A protective layer 1148 is provided on one side of the first source electrode 1146 away from the first base substrate 112, and the protective layer 1148 covers the first source electrode 1146 and the drain electrode 1147. A first planarization layer 115 is provided on one side of the source and drain electrodes away from the first base substrate 112. The first planarization layer 115 is provided on one side of the protective layer 1148 away from the first base substrate 112. The first planarization layer 115 covers protective layer 1148, and the surface of the first planarization layer 115 away from the first base substrate 112 is flat.

In other embodiments, the source and drain electrodes may also include a second source electrode (not shown in FIG. 27), and a second planarization layer (not shown in FIG. 27) is provided on one side of the second source electrode away from the first base substrate 112. The second planarization layer covers the second source electrode and the first planarization layer 115. The second source electrode is connected to the first source electrode 1146 through a via hole.

It should be noted that a buffer layer 113 is usually provided between the first base substrate 112 and the thin film transistor 114.

The pixel layer 116 includes a pixel definition layer 117 and a plurality of sub-pixels 118. The pixel definition layer 117 and the pixel layer 116 are provided on a side of the driving backplate 111 away from the first base substrate 112. The pixel definition layer 117 has a plurality of pixel openings 1171. The plurality of sub-pixels 118 are respectively provided in the plurality of pixel openings 1171. The array of the plurality of sub-pixels 118 is distributed on the side of the driving backplate 111 away from the first base substrate 112. Specifically, the sub-pixels 118 may be located on the side of the first planarization layer 115 or the second planarization layer away from the first base substrate 112. It should be noted that the sub-pixels 118 may include red sub-pixels, green sub-pixels and blue sub-pixels according to different emitting colors.

Each sub-pixel 118 may include a third electrode 1181, a light-emitting element 1182 and a fourth electrode 1183. The third electrode 1181 is located on the surface of the driving backplate 111 away from the first base substrate 112. The light-emitting element 1182 is provided on the surface of the third electrode 1181 away from the first base substrate 112. The fourth electrode 1183 is provided on the surface of the light-emitting element 1182 away from the first base substrate 112. The light-emitting element 1182 can be driven to emit light through the third electrode 1181 and the fourth electrode 1183 to display an image.

The third electrode 1181 is connected to the first source electrode 1146 or the second source electrode. When the thin film transistor 114 only includes the first source electrode 1146, the third electrode 1181 is connected to the first source electrode 1146, and the pixel definition layer 117 is provided to cover the third electrode 1181 and the first planarization layer 115. When the thin film transistor 114 further includes a second source electrode, the third electrode 1181 is connected to the second source electrode, and the pixel definition layer 117 is provided to cover the third electrode 1181 and the fourth planarization layer.

The fourth electrode 1183 can be used as a cathode, and the third electrode 1181 can be used as an anode. The light-emitting element 1182 can be driven to emit light by applying a signal to the third electrode 1181. The specific light-emitting principle will not be described in detail here. The light-emitting element 1182 may include an electro-organic light-emitting material. For example, the light-emitting element 1182 may include an auxiliary layer and a light-emitting layer sequentially stacked on the third electrode 1181. The auxiliary layer may generally include a hole injection layer, a hole transport layer, an electron transport layer and electron injection layer. Generally, a pattern area is provided on the mask plate, and processes such as evaporation are used to form auxiliary layers of sub-pixels 118 of different colors and light-emitting layers of sub-pixels 118 of different colors.

The encapsulation layer 119 is provided on one side of the pixel layer 116 away from the first base substrate 112 to cover the pixel layer 116 to prevent water and oxygen erosion. The encapsulation layer 119 may have a single-layer or multi-layer structure, and the material of the encapsulation layer 119 may include organic or inorganic materials, which are not specifically limited here.

In this embodiment, the encapsulation layer 119 may include a first inorganic encapsulation layer 1191, an organic encapsulation layer 1192 and a second inorganic encapsulation layer 1193. The first inorganic encapsulation layer 1191 is provided on one side of the pixel layer 116 away from the first base substrate 112. The organic encapsulation layer 1192 is provided on one side of the first inorganic encapsulation layer 1191 away from the first base substrate 112. The second inorganic encapsulation layer 1193 is provided on one side of the organic encapsulation layer 1192 away from the first base substrate 112. The first inorganic encapsulation layer 1191 and the second inorganic encapsulation layer 1193 can be formed by vapor deposition, and the organic encapsulation layer 1192 can be formed by printing and leveling with inkjet printing ink.

The non-display area 102 is provided with a plurality of banks 104 located away from the display area in order. The plurality of banks 104 may include a first bank 1041 and a second bank 1042. The first bank 1041 is arranged around the display area; and the second bank 1042 is arranged around the first bank 1041.

Embodiments of the present disclosure provide a display device. The display device includes the display panel described in any one of the above embodiments of the present disclosure. The display device can also refer to the specific structure and beneficial effects of the display panel, which will not be described again here.

The display device can be a traditional electronic device, such as a mobile phone, a computer, a television, or a camcorder, or it can be an emerging wearable device, such as a virtual reality device and an augmented reality device, which are not listed here.

It should be noted that in addition to the display panel, the display device also includes other necessary components and parts. Taking a mobile phone as an example, the display device also includes other necessary components and parts such as a casing, a circuit board, etc. Those skilled in the art can make supplement accordingly based on the specific use requirements of the display device and the detailed content are omitted here.

Other embodiments of the disclosure will be readily apparent to those skilled in the art from consideration of the specification and practice of the disclosure herein. This application is intended to cover any variations, uses, or adaptations of the disclosure that follow the general principles of the disclosure and include common knowledge or customary technical means in the technical field that are not disclosed in the disclosure. It is intended that the specification and examples be considered as exemplary only, with a true scope and spirit of the disclosure being indicated by the following claims.

What is claimed is:

1. A display panel, comprising a display area, wherein the display area comprises a first display area and a second display area arranged around the first display area, and the display panel comprises a display substrate and a touch screen, the touch screen comprises:
   a first touch control layer provided on a side of the display substrate, wherein the first touch control layer comprises at least one first electrode extending along a first direction, the first electrode is disconnected in the first display area, and a first segment and a second segment are formed;
   a second touch control layer provided on a side of the first touch control layer away from the display substrate, wherein the second touch control layer is insulated from the first touch control layer, the second touch control layer comprises at least one second electrode extending along a second direction, the second direction intersects the first direction, the second electrode is disconnected in the first display area, and a third segment and a fourth segment are formed;
   a third touch control layer provided on a different layer from the first touch control layer and the second touch control layer, wherein the third touch control layer is insulated from the first touch control layer and the second touch control layer, the third touch control layer comprises at least one set of a first connection part and a second connection part, the second connection part and the first connection part are not in conduction with each other and form a capacitance, the first segment and the second segment are electrically connected through the first connection part, the third segment and the fourth segment are electrically connected through the second connection part, and a material of the third touch control layer is transparent conductive material.

2. The display panel according to claim 1, wherein the second connection part and the first connection part are arranged on a same layer, and the second connection part is spaced apart at the outer periphery of the first connection part.

3. The display panel according to claim 2, wherein the third touch control layer is provided between the first touch control layer and the second touch control layer, and the touch screen further comprises:
   a first insulating layer provided between the first touch control layer and the third touch control layer, wherein a first via hole is provided on the first insulating layer, and the first touch control layer passes through the first via hole and is electrically connected to the first connection part;
   a second insulating layer provided between the third touch control layer and the second touch control layer, wherein a second via hole is provided on the second insulating layer, and the second touch control layer passes through the second via hole and is electrically connected to the second connection part.

4. The display panel according to claim 2, wherein the third touch control layer is provided on a side of the first touch control layer close to the display substrate, and the touch screen further comprises:
   a first insulating layer provided between the first touch control layer and the third touch control layer, wherein a first via hole and a second via hole are provided on the first insulating layer;
   a second insulating layer provided between the first touch control layer and the second touch control layer, wherein a third via hole is provided on the second insulating layer, an orthographic projection of the third via hole on the display substrate is located within an orthographic projection of the first via hole on the display substrate;
   wherein the first touch control layer passes through the second via hole and is electrically connected to the second connection part, and the second touch control layer passes through the third via hole and the first via hole and is electrically connected to the first connection part.

5. The display panel according to claim 2, wherein the third touch control layer is provided on a side of the second touch control layer away from the display substrate, and the touch screen further comprises:
   a first insulating layer provided between the first touch control layer and the second touch control layer, wherein a first via hole is provided on the first insulating layer;
   a second insulating layer provided between the second touch control layer and the third touch control layer, wherein a second via hole and a third via hole are provided on the second insulating layer, and an orthographic projection of the second via hole on the display substrate is located within an orthographic projection of the first via hole on the display substrate;
   wherein the first touch control layer passes through the first via hole and the second via hole and is electrically connected to the first connection part, and the second touch control layer passes through the third via hole and is electrically connected to the second connection part.

6. The display panel according to claim 3, wherein the first connection part is circular and the second connection part is annular;
   a diameter of the first connection part is: $D2 \geq D1+2b$;
   a width of the second connection part is: $A \geq 2b$;
   wherein: D2 is the diameter of the first connection part, D1 is a diameter of a second opening, b is a diameter of the first via hole, and A is the width of the second connection part.

7. The display panel of claim 2, wherein the first touch control layer comprises a plurality of first electrodes extending along the first direction, and the plurality of first electrodes are disconnected in the first display area, and a plurality of sets of first segments and second segments are formed;
- the second touch control layer comprises a plurality of second electrodes extending in the second direction, and the plurality of second electrodes are disconnected in the first display area, and a plurality of sets of third segments and fourth segments are formed;
- the third touch control layer comprises a plurality of sets of first connection parts and second connection parts, the plurality of sets of first connection parts and second connection parts form a plurality of capacitors, the plurality of first connection parts are not in conduction with each other, the plurality of the second connection parts are not in conduction with each other, each set of the first segment and the second segment is electrically connected through one of the first connection parts, and each set of the third segment and the fourth segment is connected through one of the second connection parts.

8. The display panel according to claim 1, wherein the second connection part and the first connection part are provided in different layers, and the first connection part is provided on a side of the first touch control layer close to the display substrate, and the second connection portion is provided on a side of the second touch control layer away from the display substrate.

9. The display panel of claim 1, wherein a part of the first touch control layer located in the first display area is removed and a first opening is formed, and a part of the second touch control layer located in the second display area is removed and a second opening is formed, an orthographic projection of the first display area on the display substrate is located within an orthographic projection of the second opening on the display substrate, and an orthographic projection of the second opening on the display substrate is located within an orthographic projection of the first opening on the display substrate.

10. The display panel according to claim 2, wherein the display panel further comprises:
- a third insulating layer provided between the display substrate and the first touch control layer.

11. The display panel according to claim 2, wherein the display panel further comprises:
- a second base substrate provided on a side of the second touch control layer away from the display substrate.

12. The display panel according to claim 1, wherein the display substrate comprises a driving backplate, a light-emitting layer and an encapsulation layer, the light-emitting layer is provided on a side of the driving backplate, and the encapsulation layer is provided on a side of the light-emitting layer away from the driving backplate, and the touch screen is provided spaced on a side of the encapsulation layer away from the driving backplate.

13. The display panel according to claim 1, wherein the display substrate comprises a driving backplate, a light-emitting layer and an encapsulation layer, the light-emitting layer is provided on a side of the driving backplate, and the encapsulation layer is provided on a side of the light-emitting layer away from the driving backplate, and the touch screen is attached to a side of the encapsulation layer away from the driving backplate.

14. A display device, comprising the display panel, wherein the display panel comprises a display area, the display area comprises a first display area and a second display area arranged around the first display area, and the display panel comprises a display substrate and a touch screen, the touch screen comprises:
- a first touch control layer provided on a side of the display substrate, wherein the first touch control layer comprises at least one first electrode extending along a first direction, the first electrode is disconnected in the first display area, and a first segment and a second segment are formed;
- a second touch control layer provided on a side of the first touch control layer away from the display substrate, wherein the second touch control layer is insulated from the first touch control layer, the second touch control layer comprises at least one second electrode extending along a second direction, the second direction intersects the first direction, the second electrode is disconnected in the first display area, and a third segment and a fourth segment are formed;
- a third touch control layer provided on a different layer from the first touch control layer and the second touch control layer, wherein the third touch control layer is insulated from the first touch control layer and the second touch control layer, the third touch control layer comprises at least one set of a first connection part and a second connection part, the second connection part and the first connection part are not in conduction with each other and form a capacitance, the first segment and the second segment are electrically connected through the first connection part, the third segment and the fourth segment are electrically connected through the second connection part, and a material of the third touch control layer is transparent conductive material.

15. The display device according to claim 14, wherein the second connection part and the first connection part are arranged on a same layer, and the second connection part is spaced apart at the outer periphery of the first connection part.

16. The display device according to claim 15, wherein the third touch control layer is provided between the first touch control layer and the second touch control layer, and the touch screen further comprises:
- a first insulating layer provided between the first touch control layer and the third touch control layer, wherein a first via hole is provided on the first insulating layer, and the first touch control layer passes through the first via hole and is electrically connected to the first connection part;
- a second insulating layer provided between the third touch control layer and the second touch control layer, wherein a second via hole is provided on the second insulating layer, and the second touch control layer passes through the second via hole and is electrically connected to the second connection part.

17. The display device according to claim 15, wherein the third touch control layer is provided on a side of the first touch control layer close to the display substrate, and the touch screen further comprises:
- a first insulating layer provided between the first touch control layer and the third touch control layer, wherein a first via hole and a second via hole are provided on the first insulating layer;
- a second insulating layer provided between the first touch control layer and the second touch control layer, wherein a third via hole is provided on the second insulating layer, an orthographic projection of the third via hole on the display substrate is located within an orthographic projection of the first via hole on the display substrate;

wherein the first touch control layer passes through the second via hole and is electrically connected to the second connection part, and the second touch control layer passes through the third via hole and the first via hole and is electrically connected to the first connection part.

18. The display device according to claim 15, wherein the third touch control layer is provided on a side of the second touch control layer away from the display substrate, and the touch screen further comprises:
 a first insulating layer provided between the first touch control layer and the second touch control layer, wherein a first via hole is provided on the first insulating layer;
 a second insulating layer provided between the second touch control layer and the third touch control layer, wherein a second via hole and a third via hole are provided on the second insulating layer, and an orthographic projection of the second via hole on the display substrate is located within an orthographic projection of the first via hole on the display substrate;

wherein the first touch control layer passes through the first via hole and the second via hole and is electrically connected to the first connection part, and the second touch control layer passes through the third via hole and is electrically connected to the second connection part.

19. The display panel according to claim 4, wherein the first connection part is circular and the second connection part is annular;
 a diameter of the first connection part is: $D2 \geq D1+2b$;
 a width of the second connection part is: $A \geq 2b$;
 wherein: D2 is the diameter of the first connection part, D1 is a diameter of a second opening, b is a diameter of the first via hole, and A is the width of the second connection part.

20. The display panel according to claim 5, wherein the first connection part is circular and the second connection part is annular;
 a diameter of the first connection part is: $D2 \geq D1+2b$;
 a width of the second connection part is: $A \geq 2b$;
 wherein: D2 is the diameter of the first connection part, D1 is a diameter of a second opening, b is a diameter of the first via hole, and A is the width of the second connection part.

* * * * *